(12) United States Patent
Maldziunas et al.

(10) Patent No.: US 7,157,678 B2
(45) Date of Patent: Jan. 2, 2007

(54) OPTICAL RADIATION INTENSITY SENSOR

(75) Inventors: Arvydas Antanas Maldziunas, Kaunas (LT); Vidamantas Ziogas, Kaunas (LT)

(73) Assignee: Accel AB, Vanersborg (SE)

( * ) Notice: Subject to any disclaimer, the term of this patent is extended or adjusted under 35 U.S.C. 154(b) by 0 days.

(21) Appl. No.: 10/875,628

(22) Filed: Jun. 24, 2004

(65) Prior Publication Data
US 2005/0023466 A1 Feb. 3, 2005

(30) Foreign Application Priority Data
Jun. 24, 2003 (SE) .................................. 0301857

(51) Int. Cl.
*G01C 21/02* (2006.01)
*H01J 3/14* (2006.01)
*H01J 5/02* (2006.01)

(52) U.S. Cl. .................. 250/203.4; 250/216; 250/239; 356/139.01

(58) Field of Classification Search ............. 250/203.4, 250/203.1, 203.3, 206.1, 206.2, 216, 239; 126/573; 165/42, 203; 236/91 F; 356/139.01, 356/141.5
See application file for complete search history.

(56) References Cited

U.S. PATENT DOCUMENTS

| 4,494,526 A * | 1/1985 | Wurst et al. ................. 126/585 |
| 4,804,832 A | 2/1989 | Gardner |
| 5,206,819 A | 4/1993 | Illing |
| 5,337,802 A | 8/1994 | Kajino et al. .................. 165/22 |
| 5,367,441 A * | 11/1994 | Wustlich ...................... 362/97 |
| 5,553,775 A | 9/1996 | Kato et al. .................. 236/49.3 |
| 5,670,774 A | 9/1997 | Hill .......................... 250/203.4 |
| 5,704,544 A | 1/1998 | Samukawa et al. ......... 236/49.3 |
| 6,084,228 A | 7/2000 | Hill et al. ................. 250/203.4 |
| 6,087,650 A | 7/2000 | Dage .................... 250/214 AL |
| 6,379,013 B1 | 4/2002 | Bechtel et al. |
| 6,396,040 B1 | 5/2002 | Hill |
| 6,888,120 B1 * | 5/2005 | Chiasson et al. ......... 250/203.4 |
| 2002/0056806 A1 | 5/2002 | Bechtel et al. |

FOREIGN PATENT DOCUMENTS

| EP | 625692 A1 | 11/1994 |
| EP | 852189 | 7/1998 |
| JP | 2298828 | 12/1990 |
| WO | WO-9007102 | 6/1990 |
| WO | WO-9924951 | 5/1999 |

OTHER PUBLICATIONS

PCT International Style Search Report (PCT/ISA/201/SE) for SE App. No. 0301932-0 (6 pages).

* cited by examiner

*Primary Examiner*—Kevin Pyo
(74) *Attorney, Agent, or Firm*—Schwegman, Lundberg, Woessner & Kluth P.A.

(57) ABSTRACT

A radiation intensity directional sensor includes a housing having an opening covered by a transparent or translucent lens element, an array of sensor elements sensitive to radiation, preferably to electromagnetic radiation in the visible and/or infrared range, and a shading element separating at least two of the sensor elements. The shading element at least partly blocks light from impinging directly on one of two sensing elements separated by the shading element. The array of sensor elements is thereby arranged for producing output signals from the at least two separated sensor elements having different amplitudes whereby the difference in amplitude is used for estimating the position of a light source in relation to the sensor housing.

23 Claims, 10 Drawing Sheets

OPTICAL RADIATION INTENSITY SENSOR

RELATED APPLICATION

This application claims priority under 35 U.S.C. 119 to SE 0301857-9, filed Jun. 24, 2003, which application is incorporated herein by reference.

TECHNICAL FIELD

The invention relates to a radiation intensity directional sensor and more particularly to a photo radiation intensity sensor. In particular the invention relates to radiation intensity directional sensors used as a sun load sensor for automatic climate control system in a vehicle. These sensors are normally sensitive to electromagnetic radiation in the visible and/or infrared range

BACKGROUND ART

Fully automated climate systems in vehicles are commonly used in vehicles. Originally such climate systems used single or multiple temperature sensors sensing the temperature in the cabin and regulated the airflow in dependence of the temperature measured by said sensors. However, the influence of the radiation of the sun is not adequately compensated for when using only a temperature sensor. Therefore it has been suggested to make use of radiation sensors, which measures the impact of the sun. Further improvements have resulted in sensors, which identifies the position of the sun in relation to the vehicle in order to further improve the regulation of the climate unit. Such sensors are known from inter alia WO 90/07102, U.S. Pat. No. 5,337,802, U.S. Pat. 5,553,775 and EP 852 189. The sensor elements described in these documents all include multiple sensor elements arranged in a housing, where said sensor elements are sensitive to light. The sensor elements are arranged at different geometrical positions of the sensor housing, whereby a sensitivity of the direction of a light source in relation to the sensor can be established. The sensors preferably also include shading elements, which prevent light from reaching one of the sensor elements when impinging from certain positions. By measuring the difference in altitude of the output signal from each of the sensor elements, an estimate of the position of the light source in relation to the sensor is calculated.

Figure 1:
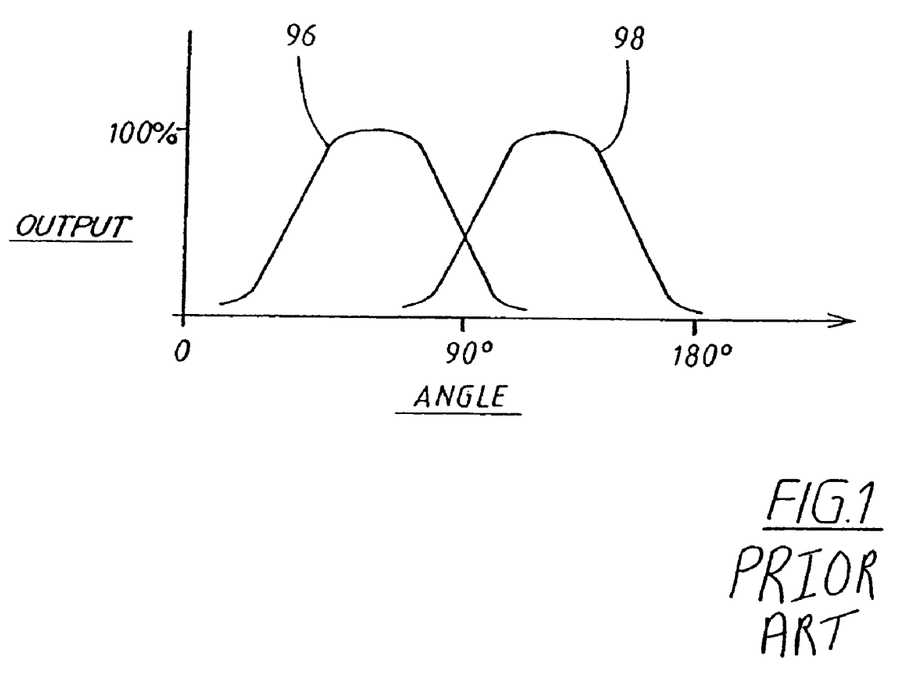
FIG. 1 shows a typical output signal from a prior art sensor having two sensor elements.

A typical response from a prior art sensor having two sensor elements is shown in FIG. 1. The sensor in the example includes a first and second sensing elements positioned in a housing in a manner such that light is blocked from reaching one of the sensor elements if impinging from a first direction and the light is blocked from reaching the other sensor element if impinging from a second opposite direction. A first left curve corresponds to the output signal produced by the first sensor element and a second right curve is produced by the second sensor element. The curves are overlapped in a small region corresponding mainly to a position where the light source impinges vertically on the sensor element. The magnitude of the signals each has a peak value outside side overlapping region and thereafter are steeply reduced to a small fractional value of said peak value. A problem with the sensor type producing such an output signal is that the position of the light source cannot be determined with accuracy outside the overlapping region. It is true that the output signal outside the overlapping interval has a magnitude dependent on the position, however, it is not possible to judge whether a small output signal is dependent on the position of the sun or if it depends on the intensity of the sun. In order to discriminate between these two variables it is necessary to have output signals from both sensor elements.

Figure 2:
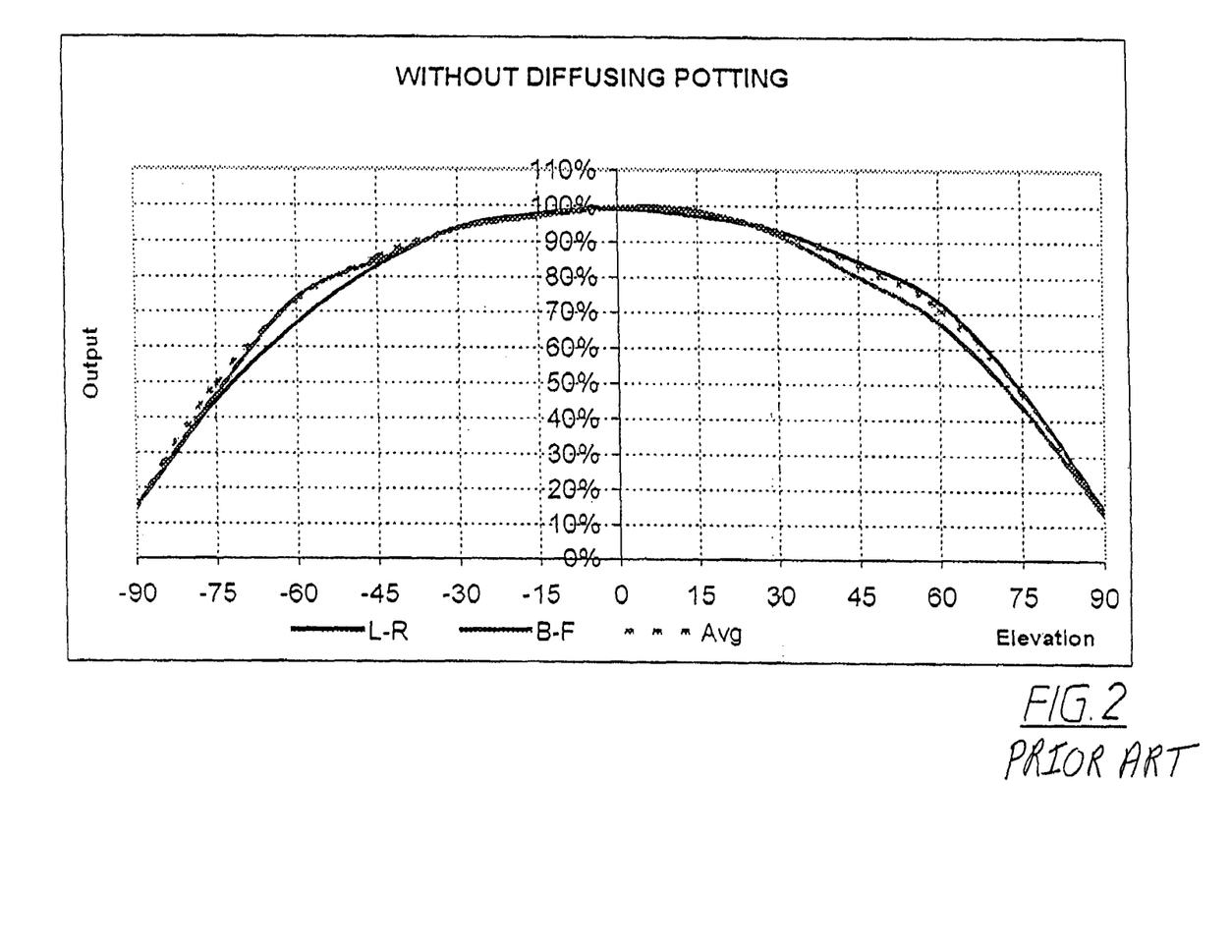
FIG. 2 shows a typical output signal from a prior art sensor having a single sensor element.

A typical response from a prior art sensor having a single sensor element is shown in FIG. 2. The output at low angles are typically low in relation to the output from vertically impinging radiation. Since heating problems in car interiors are mostly occurring at impinging angles of about 30–80°, this type of sensor does not conform well for the purpose of detecting a heating effect. Generally, in order to detect the magnitude of the flux of the optical radiation it would be advantageous to have a sensor that has a response from different impinging angles which is as flat as possible. In the event a totally flat output could be generated the output would directly indicate the magnitude of the flux of the optical radiation.

DISCLOSURE OF INVENTION

An embodiment of the invention provides a sensor element, which produces a higher ratio of the output amplitude at low impinging altitudes (>45°) to the output at vertically impinging (0°) radiation.

Figure 3:
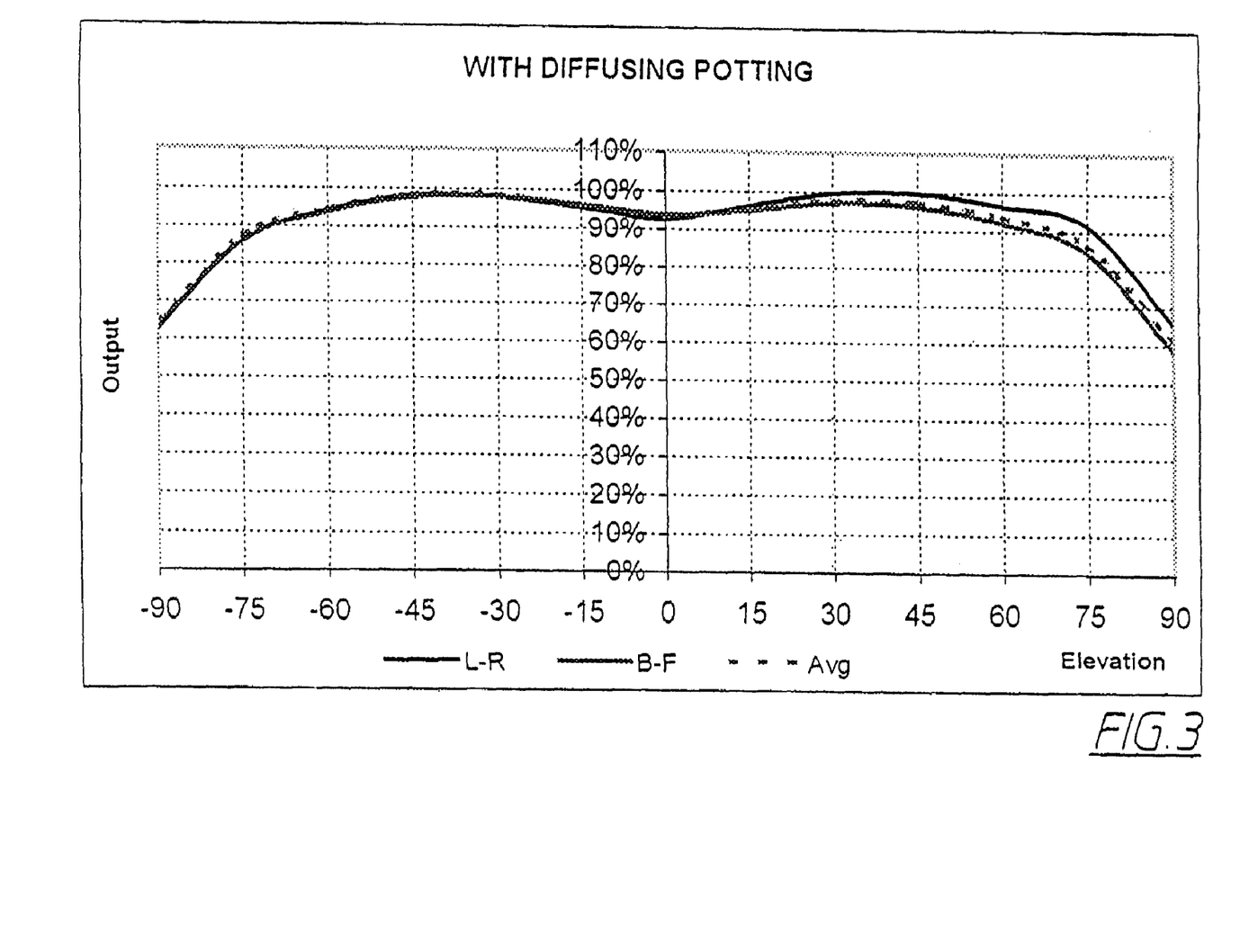
FIG. 3 shows a typical output signal from a sensor according to the invention having a single sensor element and a diffusive compound positioned between an aperture of the sensor and the sensor element.

A sensor according to an embodiment of the invention includes housing having a chamber containing a diffusive compound that is a potting, which compound is positioned between said housing and said at least one sensor element. By providing a diffusive compound between a sensor aperture and a sensor element, the response curve will change such that a higher ratio of the output amplitude at low impinging altitudes (>45°) to the output at vertically impinging (0°) radiation is produced. This is shown in FIG. 3, where the output response from a sensor having a single sensor element and a diffusive compound positioned between an aperture of the sensor and the sensor element. Clearly the sensor with diffuser conforms better to requirements of in car industry because the most heating effect of car interior is when elevation ~30°–80°.

A further aspect of the invention is to provide a radiation intensity directional sensor including at least one sensor element, which sensor element produces an output signal having a substantial amplitude over a large overlapping region whereby the sensor is capable of estimating the angular position of the sun over a large range. In an embodiment, a sensor includes a chamber containing a diffusive compound, which compound is positioned between a housing and at least one sensor element and wherein the compound is flooding the chamber. By providing, a chamber containing a diffusive compound inside the housing at a position between a translucent or transparent portion of the housing and an array of sensor elements, a sensor element, which is positioned in a position where a shading element blocks the light from impinging directly on the sensor element, would be exposed for light that is transmitted through the diffusive compound. This would have the effect that each sensor element produces an output signal also when respectively sensor element is positioned in a position inside said housing where light would not impinge on the sensor element in the absence of the diffusive compound.

In an embodiment of the invention, the sensor includes an array of sensor elements, which are arranged to detect both the direction and the intensity of the radiation source. In an option, the sensor includes a shading element separating at least two sensor elements. In an option, the shading element is arranged to prevent exposure of radiation of the sensor elements separated by the shading element to a degree depending of the position of the photo radiation intensity directional sensor in relation to a source of photo radiation. In an option, the shading element is thereby arranged for creating differences in output amplitudes from the sensor elements which difference in amplitude is used for estimating the position of the source of radiation. In an option, the shading element divides the chamber into at least two sub compartments, each containing one or several sensor elements. In an option, the chamber includes a top region forming part of the sub compartments. The top region is vertically arranged in relation to the shading element such that the shading element does not prevent photo radiation from impinging on at least a portion of each sub compartment in the top region. In an option, the top region is positioned vertically above the shading element. In an option, the chamber includes a bottom region forming part of the sub compartments, where the bottom region is vertically arranged below an upper edge of the shading element. In an option, the sensor elements are positioned inside the chamber and being exposed to the diffusive compound.

In an embodiment, sensor includes a compound that is arranged to preserve the sensor element from oxidising. In an option, the sensor elements are positioned on a printed circuit board which carries further electronic circuits. In an option, the printed circuit board is positioned at least partly inside the sensor chamber such that electronic circuits and sensor element are protected from negative influence on the environment by the diffusive compound.

In an embodiment, the photo radiation intensity sensor includes a radiation filter transparent to a defined frequency interval. The radiation filter is arranged to block radiation outside said frequency interval from impinging on the sensor elements. In an option, the radiation filter is constituted by the diffusive compound. In an option the radiation filter includes a lens element.

In an embodiment, the sensor elements are sensitive to infrared and/or visible light.

In an embodiment, the diffusive compound is a liquid or a gel.

Other embodiments are described herein and would be understood by one of skill in the art upon reading the present disclosure. These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

BRIEF DESCRIPTION OF DRAWINGS

Embodiments of the invention will be described in detail below, with references to appended drawings where.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 4:
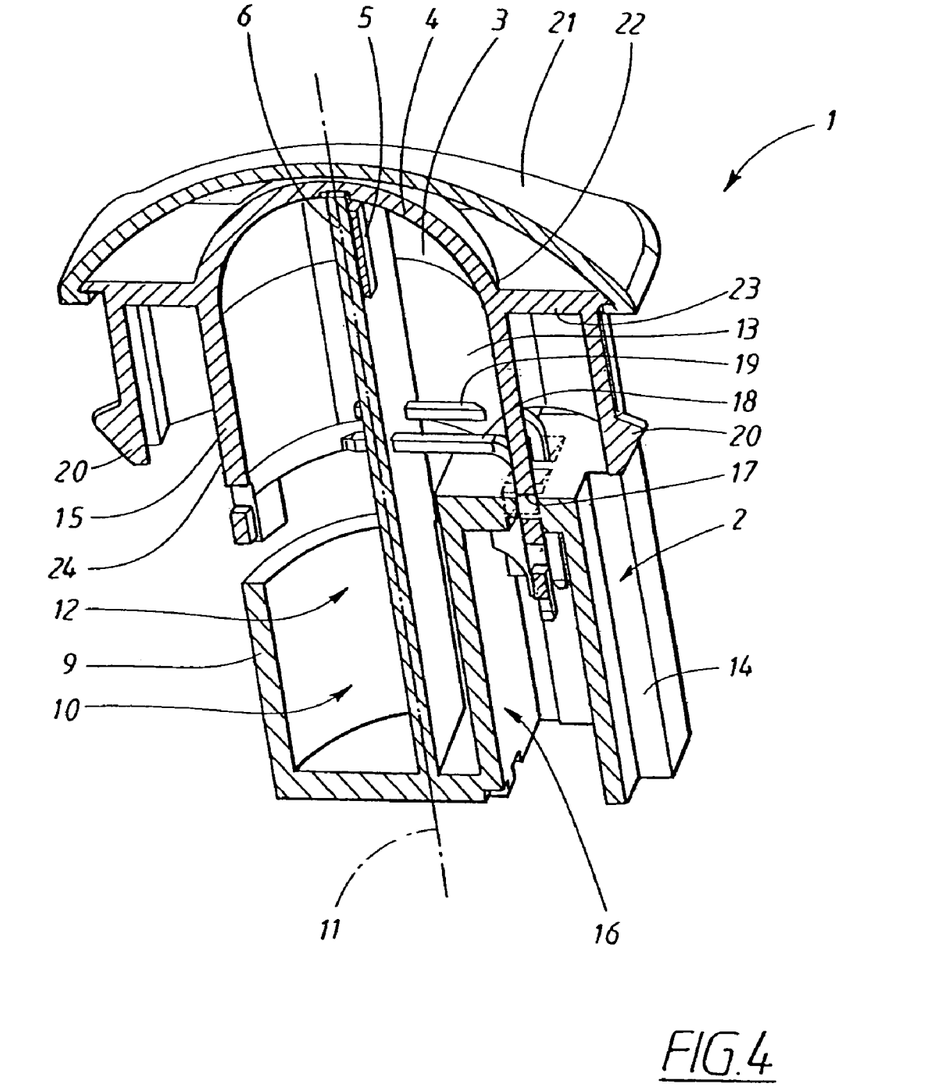
FIG. 4 shows a first embodiment of an optical radiation intensity directional sensor according to the invention.

In FIG. 4 an embodiment of an optical radiation intensity directional sensor 1 is shown. The directional sensor comprises a housing 2 having an opening 3, which is covered by a lens element 4. The lens element 4 is transparent or translucent. In an embodiment the lens element function as a radiation filter being transparent to radiation within a well-defined frequency interval. The lens element 4 is in the shown embodiment dome shaped.

Figure 7:
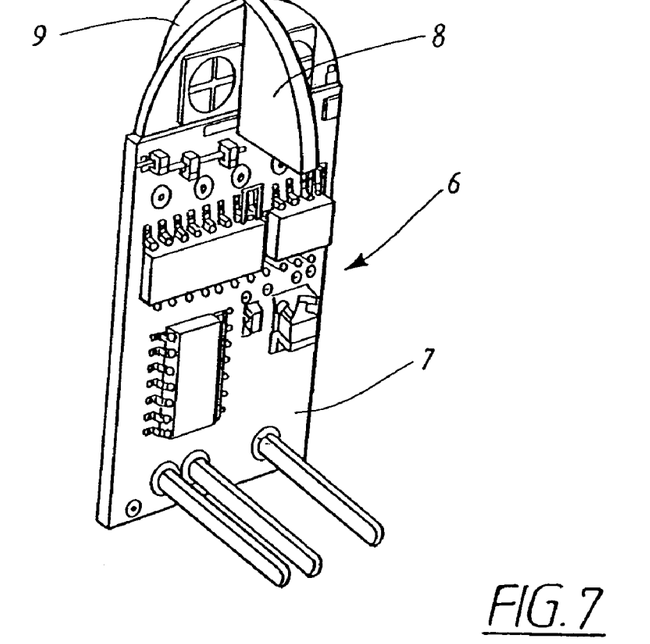
FIG. 7 shows a printed circuit board carrying sensor elements used in the first embodiment described in FIG. 4.

The sensor 1 further includes an array of sensor elements 5 distributed within said housing. A shading element 6 at least partly block light from impinging directly on one of two sensor elements within said array of sensor elements 5 separated by said shading element. In the shown example the sensor elements 5 are positioned on opposite sides of the shading element 6 formed by a printed circuit board 7 carrying the sensor elements and other electronic components used in the sensor. In the embodiment shown in FIG. 7 the shading element is formed by the printed circuit board 7 and two flanges 8,9 vertically extending from said printed circuit board 7. This embodiment includes four sensor elements 5, wherein two are positioned on each side of the circuit board and being separated by the extending flanges 8,9 on each side of the circuit board. Thereby four different regions, which are separated from being simultaneously exposed to directly impinging sunlight, are created.

The housing 2 of the optical radiation intensity directional sensor 1 is in the shown embodiment formed by outer walls 9 forming a substantially cylindrically shaped internal cavity 10, where the shading element 6 is positioned. The shading element 6 is extending along a symmetry axle 11 of the cavity 10 and divides the cavity 10 into separate sub compartments 12, 13. The housing is, in the shown example, formed by a lower through shaped part 14, which is tightly connected to an upper part 15, which includes the lens element 4. In the case the upper part 15 and the lens element 4 are integrally formed, a portion of the upper part 15 not forming the lens must be prevented from exposure to light. This can be done by positioning the dome shaped lens element 4 into an opening 22 of a non-transparent cover plate 23. Another possibility is to arrange a non-transparent covering material 24 around the lower cylindrical part of the upper part 15.

The lower part 14 comprises a web portion 16 extending into the cylindrically shaped internal cavity. The web portion 16 is provided with openings 17 through which electrical connectors 18, 19 to the electronic components, including the sensor elements 5, are extending.

The upper part 15 is provided with a snap lock mechanism 20 arranged for securing the optical radiation intensity directional sensor 1 in a recess in a vehicle. The optical radiation intensity directional sensor 1 is furthermore equipped with a lid 21, which facilitates the freedom of design of parts of the optical radiation intensity directional sensor, which are visible after mounting of the optical radiation intensity directional sensor in a vehicle.

The cavity 10 forms a chamber containing a diffusive compound (not shown) positioned between said lens and said array of sensor elements. The compound is preferably a potting in the form of a liquid or a gel, which is filled into the cavity 10, preferably in such a way that the compound is flooding the cavity 10. Preferably the compound is more or less liquid in order to enable the filling into the cavity 10, and may be of such a composition that it cures when the filling procedure is completed. The curing may be of such a nature that the compound, being a liquid of a relatively low viscosity, cures to a liquid of higher viscosity, for example a gel. The curing may also result in a solid compound.

In a test example the following diffusive compound has been used: Wacker SilGel 612 with small quantity of Elastosil white colour paste FL; Wacker SilGel 612 is of two liquid components (A and B), which together cure to gel of high optical transparency; when adding small amount of Elastosil white colour paste FL (0.1% to 1% by weight) this gel becomes opaque ("milky") with good diffusive properties of optical radiation; concentration of this paste also can be used for control of sensitivity of sensor in aggregate: when increasing percentage of paste—sensitivity decreases and vice versa.

Wacker SilGel 612 is a two part crosslinking silicone rubber. Elastosil is a mixture of pigments and a reactive silicone polymer. Both are trademarks of Wacker.

Figure 11:
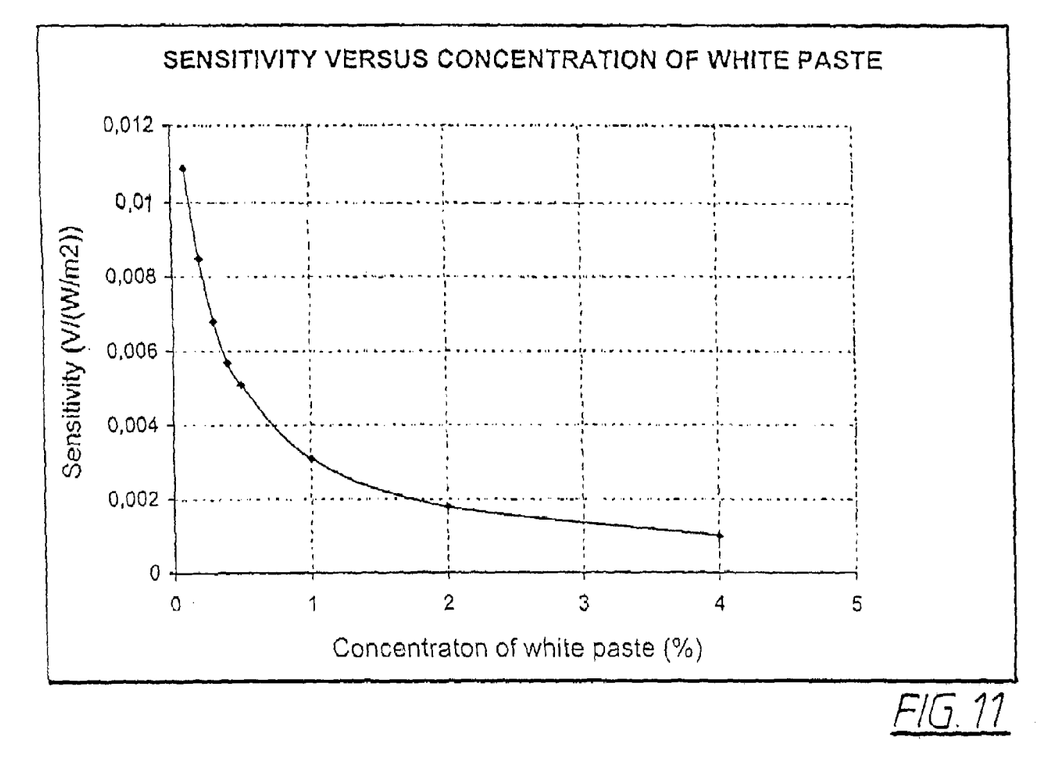
FIG. 11 shows a diagram of sensitivity versus concentration of white paste in compound.

In FIG. 11, a diagram of sensitivity versus concentration of white paste in compound. Tests has shown that a concentration between 0.1%–1% provides adequate degree of opaqueness for providing uniform output level for a single sensor body without reducing the output level too much. In an embodiment, the concentration is in between about 0.1% and 1%

Figures 5, 6:
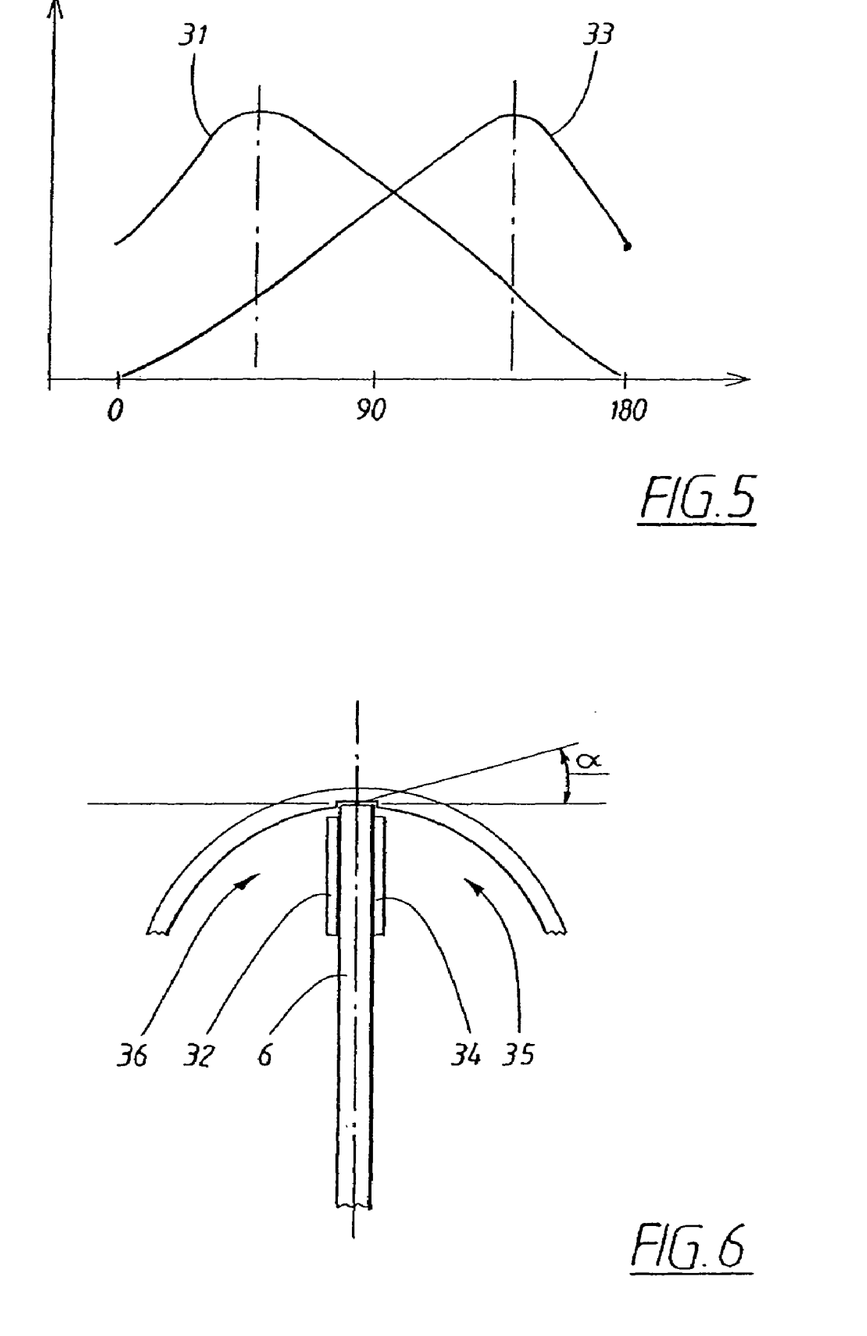
FIG. 5 shows an output signal from an optical radiation intensity directional sensor according to the invention.
FIG. 6 shows a schematic example of an a ray impinging at an angle of α degrees toward a right hand side of a housing according to the invention.

In FIG. 5, an output signal from an optical radiation intensity directional sensor according to an embodiment of the invention is shown.

The curve includes a left portion 31 originating from a left hand sensor element 32 (FIG. 6) and a right portion 33 originating from a right hand sensor element 34. The sensor elements 32, 34 are positioned on opposite sides of a shading element 6. An example of an optical radiation beam impinging at an angle of a degrees from the right hand side is shown in FIG. 6. When $\alpha=0°$ optical radiation is diffused by the diffusive compound 35 contained in the chamber 36 surrounding the sensor elements 32, 34 and thereby providing an output signal from the right hand signal at a medium magnitude. The output signal when $\alpha=0°$ is at a zero magnitude from the left sensor element 32. As soon as $\alpha>0°$, the left sensor element 32 provides an output signal, which at small $\alpha$ is generally proportional to $\alpha$. This is due to the fact that even at small $\alpha$ the diffusive compound 35 is exposed to optical radiation at the left hand side. The optical radiation impinging on the left hand sub compartment is directed by diffusion to the sensor element. If the diffusive compound were absent, the output signal would be equal to zero at low altitudes. For small $\alpha$, the magnitude of the output signal of the right sensor element is continuously increasing until approximately $\alpha=45°$, where the right hand sensor element has its peak value. The left hand sensor element 32 provides an output signal, which continuously increases until approximately $\alpha=135°$, where the left hand sensor element has its peak value. By the inclusion of the diffusive compound inside the housing the overlapping range is extended to 180°. Using the vertical position of the sensor elements as shown in the example, the overlapping range would essentially equal zero if the diffusive compound is not included. Due to the diffusion, the output signal of the sensor elements is essentially independent of the position of a surface normal of the sensor element in the housing in contrast to the situation when no diffusive compound is used.

Figure 8:
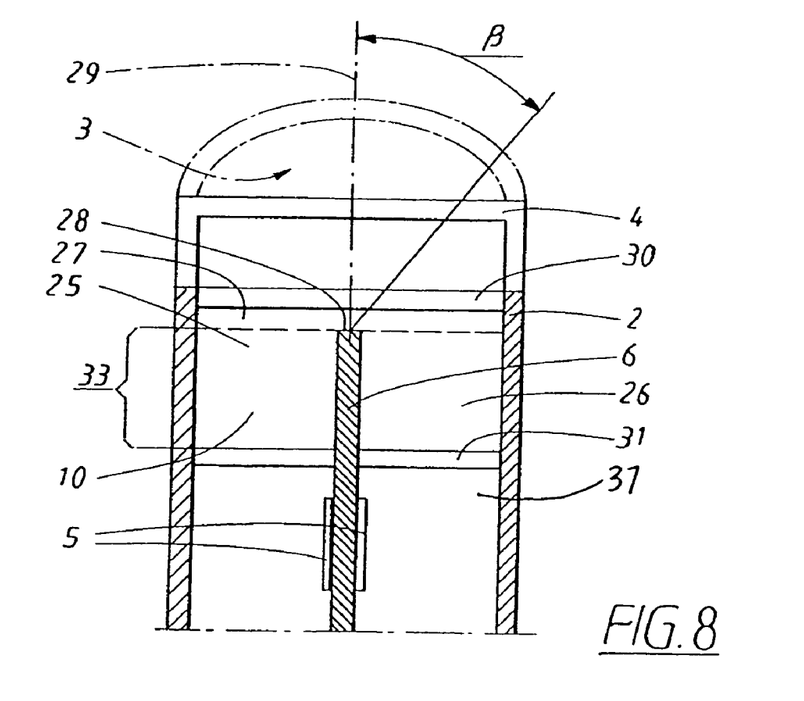
FIG. 8 shows a second embodiment of an optical radiation intensity directional sensor according to the invention.

In FIG. 8 a second embodiment of the invention is shown. The optical radiation intensity directional sensor comprises a housing 2 having an opening 3 covered by a transparent or translucent lens element 4. The optical radiation intensity directional sensor 1 comprises an array of sensor elements 5 sensitive to light, and a shading element 6 separating at least two of said sensor elements 5. In the shown embodiment the sensor elements 5 are positioned on opposite sides of a vertical division wall 6.

The housing 2 further comprises a chamber 10 containing a diffusive compound positioned between said lens and said array of sensor elements. The shading element 6 divides the chamber 10 into at least two sub compartments 25, 26, each containing one or several sensor elements 5.

In the shown embodiment the sensor elements are positioned inside the chamber 10 and are thus exposed by the liquid, which in an embodiment has a protective quality reducing oxidation of the sensor elements 5.

In the embodiment shown in FIG. 8, the chamber 10 includes a top region 27 forming part of said at least two sub compartments. The top region 27 is vertically arranged in relation to said shading element 6 such that said shading element does not prevent light from impinging on at least a portion of each sub compartment in said top region. That is an upper edge 28, which is facing the lens element 4, of the shading element 6 is positioned below the top region 27. The top region 27 is thus positioned vertically above the upper edge 28 shading element.

The chamber also includes a bottom region 37 forming part of said at least two sub compartments 25, 26, where said bottom region is vertically arranged below an upper edge of said shading element.

Using the suggested configuration of the chamber in relation to the shading element, an output signal will be produced from each sensor at a range of an impinging angle $\beta$ between 0° and 90° with a symmetry axle 29 of the housing 2 running in a plane defined by the shading element 6. The magnitude of the output signal from each sensor element will be dependent on the impinging angle $\beta$.

In an embodiment of the invention the optical radiation intensity sensor includes 1 a radiation filter transparent to a defined frequency interval, which radiation filter is arranged to block radiation outside said frequency interval from impinging on said sensor elements. The radiation filter is according to one embodiment of the invention formed by the diffusive compound. In an alternative embodiment the lens element is provided with a filtering capacity, which can be obtained by choice of material of the lens element or by arranging a cover sheet of a filtering material on the lens element. A further possibility is to include a separate second lens element, which could be formed either or both of the upper and lower partition walls 30, 31 of the chamber 10. (FIG. 7) In an embodiment, the sensor element should be sensitive in the infrared region.

Figure 9:
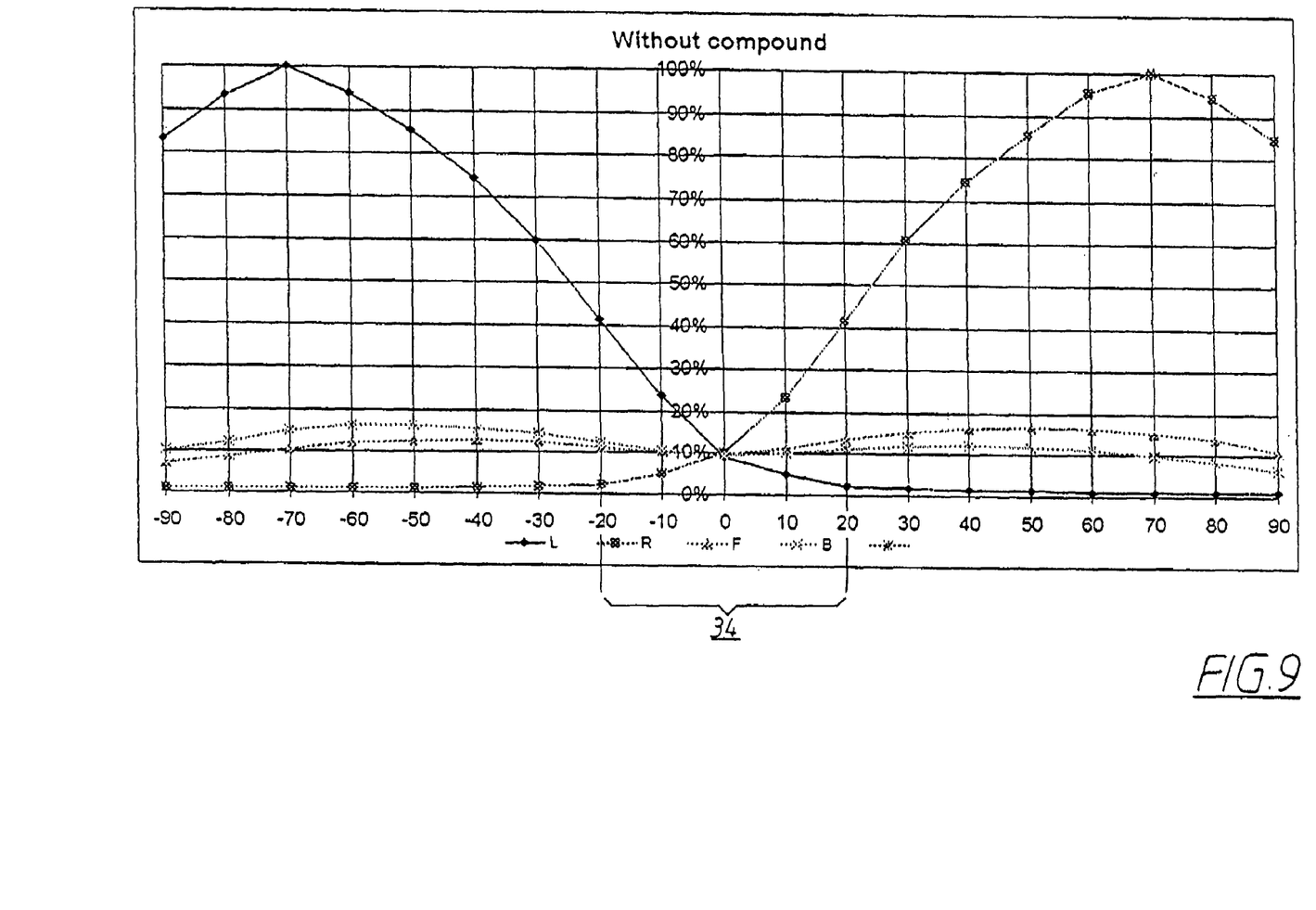
FIG. 9 shows an output signal from an optical radiation intensity directional sensor without inclusion of the diffusive compound.
Figure 10:
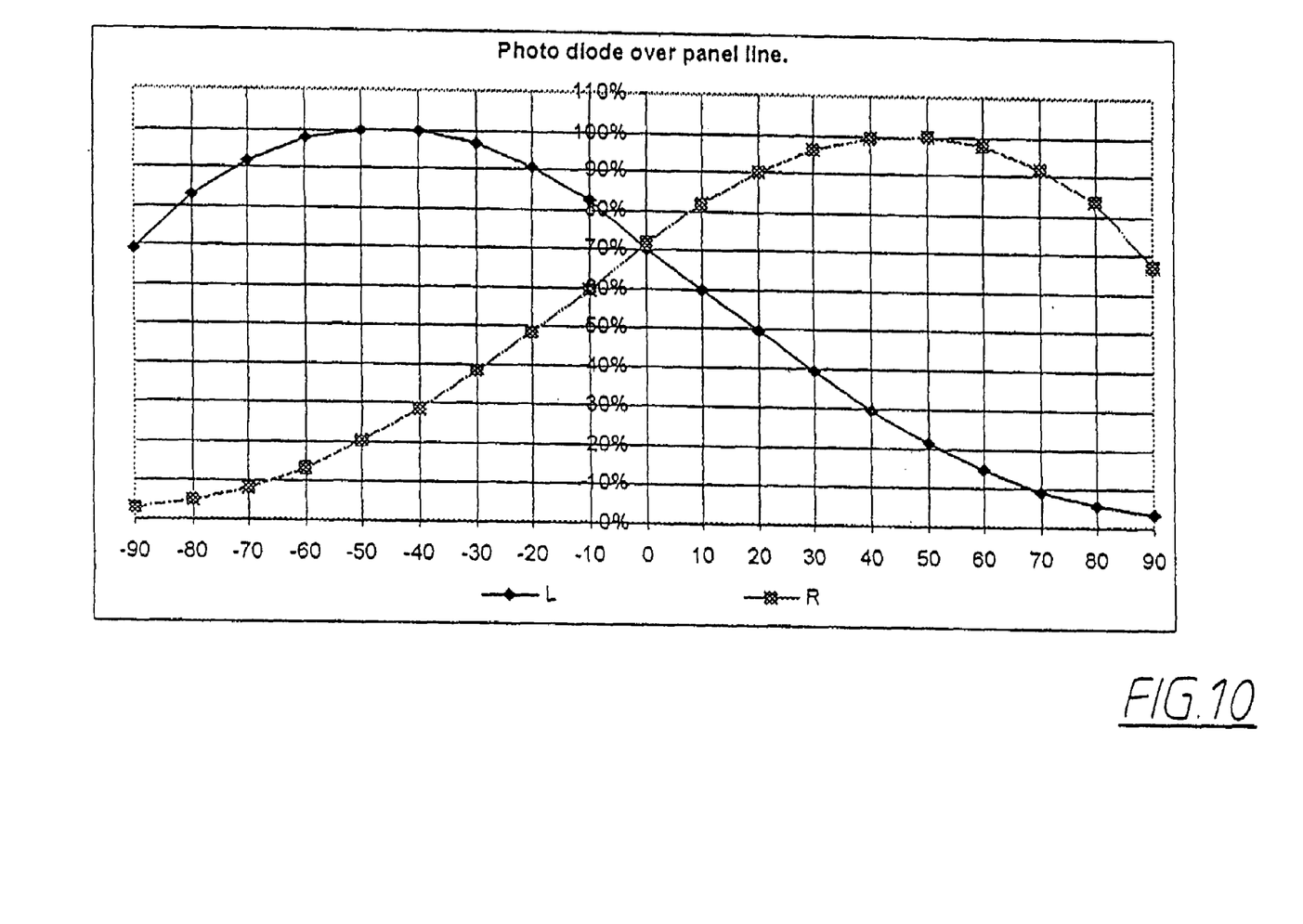
FIG. 10 shows an output signal from an optical radiation intensity directional sensor including a diffusive compound.

In FIGS. 9 and 10 the response curve from an array of sensor elements including a left and a right sensor element are shown. In the example shown in FIG. 9 the diffusive compound is not included. The overlapping region of the signals from the left hand and right hand encompasses an impinging angle from −20° to +20°. In the example shown in FIG. 10 a diffusive compound is included. The overlapping region encompasses in this case the whole region from −90° to +90°. In order to produce an output signal having an acceptable signal to noise ratio the quota between the signals from the left and right sensor should not be too small or too large.

Figure 12:
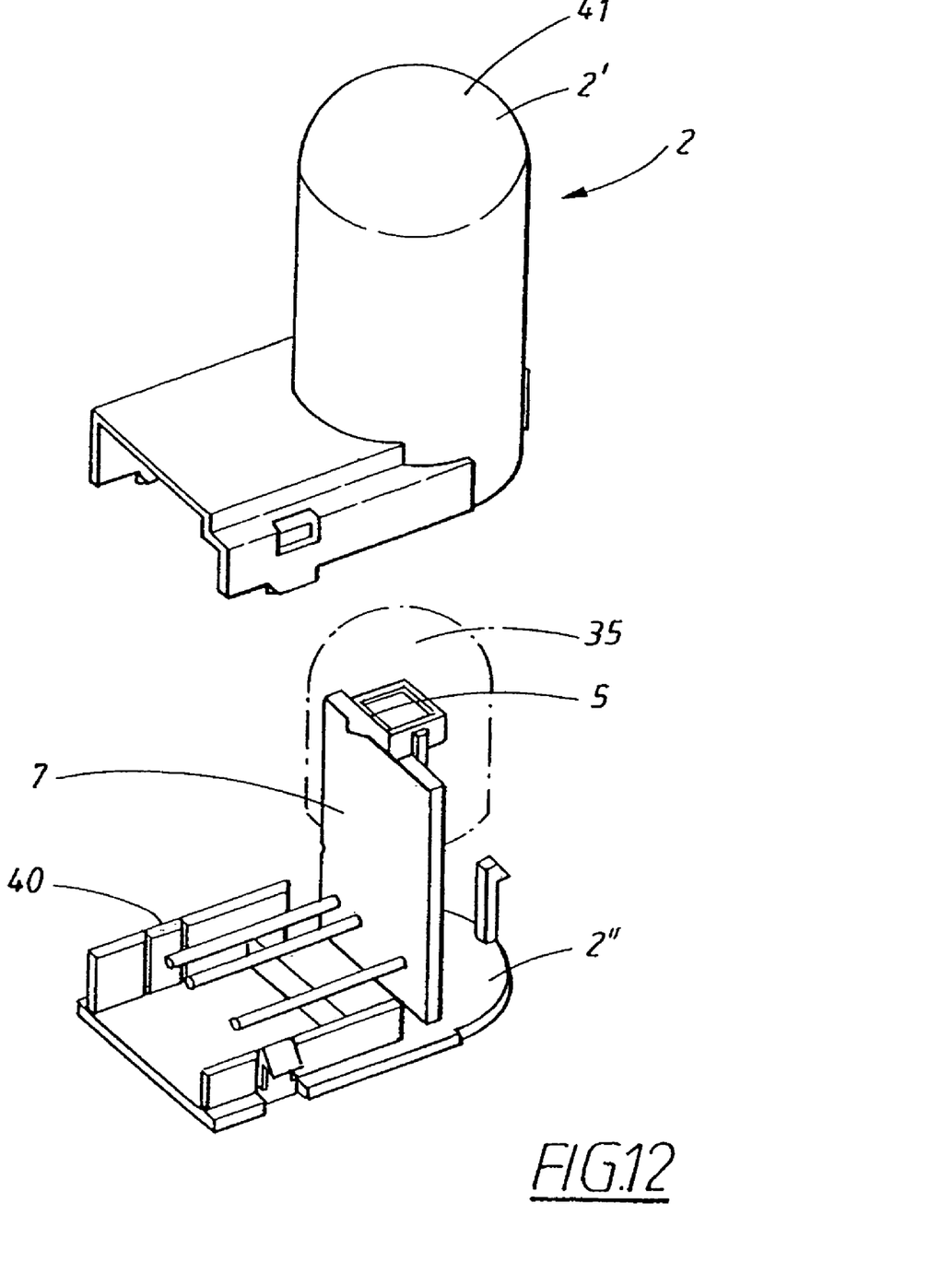
FIG. 12 shows an embodiment of a single zone optical radiation sensor.

In FIG. 12, an embodiment of a single zone optical radiation sensor is shown. The sensor comprises a housing 2 formed by an upper dome shaped part 2' and a lower bottom part 2". The bottom part 2" and the upper part enclose a cavity or chamber in which a circuit board 7 is positioned the circuit board preferably carries a sensor element 5. The upper part 2' is at least partly formed in a material, which is translucent to the radiation, which should be detected. In the shown embodiment the sensor element is constituted by a single sensor element, which is mounted in a horizontal fashion in the housing. By a horizontal fashion is meant that a surface normal of the sensor element 5 is pointing toward a transparent portion 41 of the housing. The circuit board carries electrical connectors 40, which extend through the housing 2. A diffusive compound 35 is positioned between the walls of the housing and the sensor element 5. Preferably, the sensor element is encased in the diffusive compound 35.

Generally, the invention relates to a photo radiation intensity sensor comprising a housing having a transparent or translucent portion, and at least one sensor element sensitive to radiation. This at least one sensor element is arranged for producing output signals which are used for estimating the sun radiation heating impact. The housing comprises a chamber containing a diffusive compound positioned between said housing and said at least one sensor element.

In a single sensor element photo radiation sensor, the array of sensors (5), used for instance in an embodiment as shown in FIG. 8, may be replaced with a single sensor element. Obviously, there will be no need for a shading element 6 in the event a single sensor element is used. The single sensor element can be positioned below a chamber 10 containing a diffusive component or alternatively be placed inside the chamber 10, whereby the protective function of the compound can be used.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A photo radiation intensity sensor comprising a housing having a transparent or translucent portion, and at least one optical sensor element sensitive to radiation, said at least one optical sensor element being arranged for producing output signals which are used for estimating the sun radiation heating impact, wherein the housing includes a chamber containing a diffusive compound that is a potting, which compound is positioned between said housing and said at least one optical sensor element.

2. A photo radiation intensity sensor according to claim 1, wherein the compound is flooding the chamber.

3. A photo radiation intensity sensor according to claim 2, wherein said sensor includes an array of sensor elements which are arranged to detect both the direction and the intensity of the radiation source.

4. A photo radiation intensity directional sensor according to claim 3, wherein said sensor includes a shading element separating at least two of said sensor elements, whereby said shading element is arranged to prevent exposure of radiation of said at least two sensor elements separated by said shading element to a degree depending of the position of the photo radiation intensity directional sensor in relation to a source of photo radiation, said shading element is thereby arranged for creating differences in output amplitudes from said at least two sensor elements which difference in amplitude is used for estimating the position of the source of radiation.

5. A photo radiation intensity directional sensor according to claim 4, wherein said shading element divides said chamber into at least two sub compartments, each containing one or several sensor elements.

6. A photo radiation intensity directional sensor according to claim 5, wherein said chamber includes a bottom region forming part of said at least two sub compartments, where said bottom region is vertically arranged below an upper edge of said shading element.

7. A photo radiation intensity directional sensor according to claim 5, wherein said sensor elements are positioned inside said chamber and being exposed to said diffusive compound.

8. A photo radiation intensity directional sensor according to claim 3, wherein said photo radiation intensity sensor includes a radiation filter transparent to a defined frequency interval, which radiation filter is arranged to block radiation outside said frequency interval from impinging on said sensor elements.

9. A photo radiation intensity directional sensor according to claim 8, wherein said radiation filter is constituted by said compound.

10. A photo radiation intensity directional sensor according to claim 8, wherein said radiation filter includes a lens element.

11. A photo radiation directional intensity sensor according to claim 3, wherein said sensor elements are sensitive to infrared and/or visible light.

12. A photo radiation intensity directional sensor according to claim 1, wherein said compound is arranged to preserve said sensor element from oxidising.

13. A photo radiation intensity directional sensor according to claim 12, wherein said sensor elements are positioned on a printed circuit board which carries further electronic circuits, wherein said printed circuit board is positioned at least partly inside said chamber such that said electronic circuits and sensor elements are protected from negative influence on the environment by the diffusive compound.

14. A photo radiation directional intensity sensor according to claim 1, wherein said diffusive compound is a liquid or a gel.

15. A photo radiation intensity directional sensor according to claim 14, wherein said sensor includes a shading element separating at least two of said sensor elements, so that said shading element is arranged to prevent exposure of radiation of said at least two sensor elements separated by said shading element to a degree depending of the position of the photo radiation intensity directional sensor in relation to a source of photo radiation, said shading element is thereby arranged for creating differences in output amplitudes from said at least two sensor elements which difference in amplitude is used for estimating the position of the source of radiation.

16. A photo radiation intensity sensor according to claim 1, wherein said sensor includes an array of sensor elements which are arranged to detect both the direction and the intensity of the radiation source.

17. A photo radiation intensity directional sensor according to claim 1, wherein said photo radiation intensity sensor includes at least two sensor elements, and further comprises a shading element that separates at least two of said sensor elements so that said shading element is arranged to prevent exposure of radiation of said at least two sensor elements separated by said shading element to a degree depending of the position of the photo radiation intensity directional sensor in relation to a source of photo radiation, each of said at least two sensor elements being mounted on said shading element.

18. The photo radiation intensity directional sensor according to claim 1, wherein the diffusive compound acts to a diffuser to transmit light to the optical sensor element.

19. A photo radiation intensity directional sensor comprising a housing having a transparent or translucent portion, and at least one sensor element sensitive to radiation, said at least one sensor element being arranged for producing output signals which are used for estimating the sun radiation heating impact, wherein the housing includes a chamber containing a diffusive compound that is a potting, which compound is positioned between said housing and said at least one sensor element,
wherein the compound is flooding the chamber,
wherein said sensor includes an array of sensor elements which are arranged to detect both the direction and the intensity of the radiation source,
wherein said sensor includes a shading element separating at least two of said sensor elements, whereby said shading element is arranged to prevent exposure of radiation of said at least two sensor elements separated by said shading element to a degree depending of the position of the photo radiation intensity directional sensor in relation to a source of photo radiation, said shading element is thereby arranged for creating differences in output amplitudes from said at least two sensor elements which difference in amplitude is used for estimating the position of the source of radiation,
wherein said shading element divides said chamber into at least two sub compartments, each containing one or several sensor elements, and
wherein said chamber includes a top region forming part of said at least two sub compartments, where said top region is vertically arranged in relation to said shading element such that said shading element does not prevent photo radiation from impinging on at least a portion of each sub compartment in said top region.

20. A photo radiation intensity directional sensor according to claim 19, wherein said top region is positioned vertically above said shading element.

21. A photo radiation intensity directional sensor according to claim 19, wherein said chamber includes a bottom region forming part of said at least two sub compartments, where said bottom region is vertically arranged below an upper edge of said shading element.

22. A photo radiation intensity directional sensor according to claim 19, wherein said chamber includes a bottom region forming part of said at least two sub compartments, where said bottom region is vertically arranged below an upper edge of said shading element.

23. A photo radiation intensity sensor comprising a housing having a transparent or translucent portion, and at least one sensor element sensitive to radiation, said at least one sensor element being arranged for producing output signals which are used for estimating the sun radiation heating impact, wherein the housing includes a chamber containing a diffusive compound that is a potting, which compound is positioned between said housing and said at least one sensor element, wherein said sensor element includes a shading element, and wherein said chamber includes a top region forming part of least two sub compartments, said top region being vertically arranged in relation to said shading element such that said shading element does not prevent photo radiation from impinging on at least a portion of each sub compartment in said top region.

* * * * *